A. CRUMBIE.
OVEN.
No. 188,600. Patented March 20, 1877.
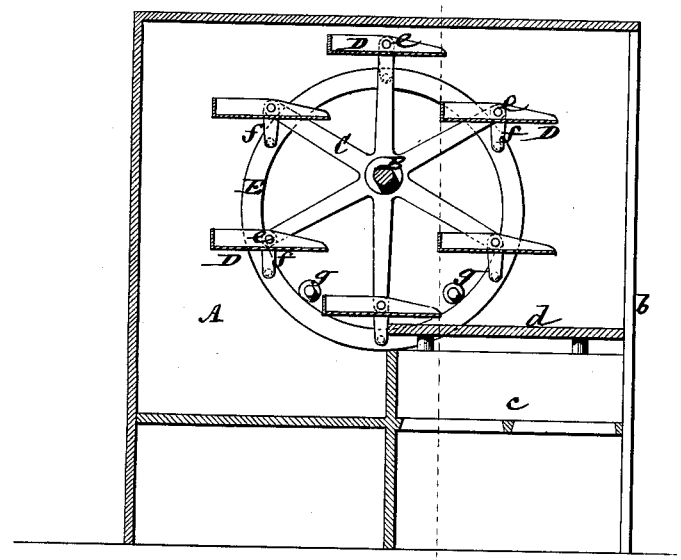
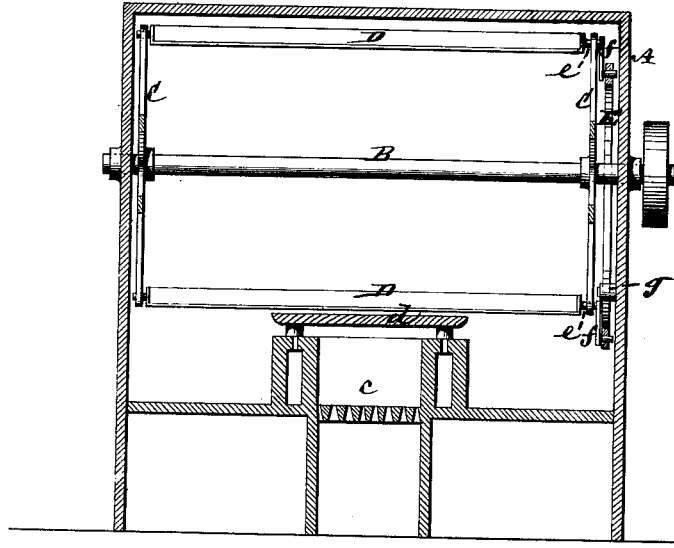

UNITED STATES PATENT OFFICE.

ALEXANDER CRUMBIE, OF NYACK, ASSIGNOR TO HIMSELF AND DAVID DONALD, OF BROOKLYN, NEW YORK.

IMPROVEMENT IN OVENS.

Specification forming part of Letters Patent No. 188,600, dated March 20, 1877; application filed February 17, 1877.

*To all whom it may concern:*

Be it known that I, ALEXANDER CRUMBIE, of Nyack, in the county of Rockland and State of New York, have invented a new and useful Improvement in Ovens, of which the following is a description, reference being had to the accompanying drawing, forming part of this specification.

This invention relates to ovens for baking bread and other articles or materials, in which a rotating carrier, arranged within the oven and provided with shelves pivoted and controlled in a positive manner to retain a horizontal position during the rotation of the carrier, is used. Such rotating carrier of shelves, on which the bread or substance to be baked is placed, affords great facility for introducing, carrying, and removing said bread or substance, free from any liability of the shelves to tip or tilt. Among the means heretofore employed for positively holding the shelves or trays in a horizontal position during the rotation of the carrier, has been a well-known mechanical movement, consisting of cranks fast on the swinging pivots of the shelves, and connected with an eccentric band or strap at either or both ends of the carrier, and arranged to hug and move, during the rotation of the carrier, around a stationary circular track, which is eccentric to the carrier. Such devices insure the desired movement, but the friction of the eccentric band or strap upon the stationary eccentric, and the impracticability of oiling, in a baking-oven, said parts to reduce such friction, necessarily operate as a drawback to the adoption of said means.

My invention consists in a combination, with the rotating carrier arranged within the oven or baking chamber, and provided with swinging shelves or trays, of a free ring, disk, or plate at either or both ends of said carrier, and suspended by cranks fast on the pivots of said shelves, to occupy, without the aid of any internal support or fixed circular track, the requisite eccentric position in relation with the carrier to insure a horizontal position of the shelves or trays during the whole rotation of the carrier. Roller or simple stud guides are or may be combined with said free ring or device to prevent it, during the rotation of the carrier, from being moved to one side by the rotating action of the carrier.

Figure 1 in the accompanying drawing, represents a vertical section of an oven in a transverse relation with its contained carrier, and as constructed in accordance with my invention, and Fig. 2 a vertical section of the same on the line $x\ x$.

A is the oven proper or baking chamber, $b$ being the front thereof. Said baking-chamber, which is here shown as constructed with a fire-place, $c$, having a top cover, $d$, may be heated in any suitable manner. B is the revolving shaft of the carrier extending across the oven, and having ends or heads C C within the oven, which heads or ends, in connection with the baking shelves or trays D D, pivoted to swing on or in said heads or ends, constitute the baking reel or carrier. The pivots $e\ e$ of the shelves or trays, which are arranged at any desired distances apart around the heads C C, have attached to their outer ends cranks $f\ f$, which, in their turn, are connected by wrist-pins with a free or loose ring, E, the weight of which is supported by the wrist-pins of the cranks, so that said ring is pendent, as it were, from the cranks, and its center kept in a vertical position below the shaft B of the carrier.

By this construction and combination of devices, the shelves or trays D D are retained in a horizontal position during the whole rotation of the carrier, to facilitate the putting on and taking off of the bread, and to prevent the free swinging shelves from tipping or tilting.

Two or more studs or roller-guides, $g\ g$, having a fixed position in the oven, and arranged to bear upon the inner periphery of the ring E, may be used to keep the latter, should its own weight not be sufficient, in position, and so that the center of said ring remains vertically below the center of the shaft B, but in no case is a fixed eccentric circular support or bearing, extending around and within the ring and producing friction, used to sustain or keep the ring in position.

I claim—

1. The combination of one or more free or loose disks or rings, E, with the rotating reel or carrier of swinging shelves D, the oven or baking chamber A, and the cranks $f$, by which said disks or rings are connected with and supported by the pivots of the swinging shelves or trays, substantially as specified.

2. The combination of two or more guiding studs or rollers, $g$, with the free or loose ring E, the rotating reel or carrier of swinging shelves D, the cranks $f$, attached to the pivots of said shelves, and the baking chamber or oven A, essentially as and for the purposes herein set forth.

ALEXANDER CRUMBIE.

Witnesses:
BENJAMIN W. HOFFMAN,
FRED: HAYNES.